(12) United States Patent
Akita et al.

(10) Patent No.: US 6,783,129 B2
(45) Date of Patent: Aug. 31, 2004

(54) SEALING DEVICE

(75) Inventors: Hideki Akita, Tsuchiura (JP); Ryohei Suzuki, Yasato-machi (JP); Osamu Gokita, Chiyoda-machi (JP); Tatsuo Takamure, Izumi (JP); Hiromasa Muraki, Yamatotakada (JP); Noriyuki Ando, Saitama (JP)

(73) Assignees: Hitachi Construction Machinery Co., Ltd., Tokyo (JP); Nippon Valqua Industries, Ltd., Tokyo (JP)

(*) Notice: Subject to any disclaimer, the term of this patent is extended or adjusted under 35 U.S.C. 154(b) by 0 days.

(21) Appl. No.: 10/258,281

(22) PCT Filed: Mar. 7, 2002

(86) PCT No.: PCT/JP02/02131
§ 371 (c)(1), (2), (4) Date: Oct. 23, 2002

(87) PCT Pub. No.: WO02/073053
PCT Pub. Date: Sep. 19, 2002

(65) Prior Publication Data
US 2003/0102635 A1 Jun. 5, 2003

(30) Foreign Application Priority Data
Mar. 13, 2001 (JP) .......................... 2001-70279

(51) Int. Cl.[7] .............................. F16J 15/32
(52) U.S. Cl. .................. 277/349; 277/402; 277/500; 277/549
(58) Field of Search .................. 277/349, 364, 277/394, 402, 407, 500, 649; 403/39, 163, 288

(56) References Cited

U.S. PATENT DOCUMENTS

| 4,457,521 A | * | 7/1984 | Morley ........................ 305/103 |
| 4,772,150 A | * | 9/1988 | Horton ........................ 403/39 |
| 5,490,730 A | | 2/1996 | Akita et al. |
| 5,794,940 A | * | 8/1998 | Brueggmann ................ 277/364 |

FOREIGN PATENT DOCUMENTS

| JP | 6-159346 | 6/1994 |
| JP | 8-105444 | 4/1996 |
| JP | 10-220459 | 8/1998 |

* cited by examiner

Primary Examiner—Anthony Knight
Assistant Examiner—Enoch Peavey
(74) Attorney, Agent, or Firm—Mattingly, Stanger & Malur, P.C.

(57) ABSTRACT

A seal device (31) for a bearing system (21) is constituted by first and second seal rings (32) and (35). The first seal ring (32) is constituted by a lip seal (33) having a lip portion (33B) in sliding contact with an end face (23B) of a bush (23) which is fitted on a joint shaft (26), and a slide tube (34) having a seal surface (34C) on an end face at an axial end away from the lip portion (33B) which is formed integrally with a tubular body portion (33A) of the lip seal (33). The second seal ring (35) is fixedly fitted in a boss (22) radially on the outer side of the first seal ring (32), and provided with a seal surface (35D) on the inner side of an annular inward collar portion (35C) for sliding contact with the seal surface (34C) of the slide tube (34).

7 Claims, 10 Drawing Sheets

SEALING DEVICE

TECHNICAL FIELD

This invention relates to a seal device which can be suitably applied, for example, to a bearing system of a working mechanism on a hydraulic excavator or other construction machines.

BACKGROUND ART

In the case of construction machines like hydraulic excavators, bearing systems are generally employed for pin joint portions in pivotally connecting boom, arm and bucket of a front working mechanism (e.g., as disclosed in Japanese Patent Laid-Open No. H6-159346).

According to the first prior art just mentioned, a bearing system is constituted by a boss member which is provided on a boom, arm or bucket, that is to say, on one of two members to be pivotally connected with each other, a bush member which is fitted on the inner peripheral side of the boss member, a pair of brackets provided on the other one of the two members in confronting positions relative to the opposite ends of the boss member, and a shaft which is provided between the two brackets as a joint shaft for pivotally connecting the boss to the brackets.

Further, the joint shaft is placed in tubular collars which are fitted on the inner peripheral side of the brackets. Provided between the collars and bush are a tubular thrust ring which is fitted on the outer periphery of the joint shaft in such a way as to secure an axial gap space between the boss member and each bracket, and a seal ring which is attached to the collar at a position radially outward of the thrust ring to seal up a gap space between the bush and each collar.

In the case of the above-described first prior art, in order to ensure smooth rotational movements of the boss member and brackets, contacting surfaces of the bush and joint shaft are maintained in a lubricated state by supplying thereto a lubricant oil from outside intermittently at predetermined time intervals during operation of the hydraulic excavator. The seal ring is provided with a lip portion in sliding contact with an end face of the bush thereby to prevent leaks of the lubricant oil through a gap space between the bush and collar.

However, in the case of the above-described first prior art, the lip portion of the seal ring is simply held in sliding contact with an end face of the bush, so that it is still probable for the lubricant oil to leak to the outside through a clearance between the bush and collar, necessitating to supply the lubricant oil at shorter time intervals.

On the other hand, for the purpose of elongating the time intervals of the lubricant oil supply as much as possible to provide an almost lubrication-free bearing system, there has been known the second prior art bearing system employing a bush which is formed of porous sintered metal material, having a highly viscous lubricant oil impregnated into pores in its body (e.g., as known from Japanese Patent Laid-Open No. H8-105444).

In this case, the viscous lubricant oil which has been impregnated into pores of the bush is markedly reduced in viscosity under the influence of the heat of friction which is generated by sliding movements (rotation) of the joint shaft within the bush, and as a result begins to exude out of the pores to sliding surfaces between the bush and joint shaft to form a lubricating-oil film thereon.

In this connection, according to the above-mentioned first prior art, a thrust ring and a seal ring are interposed between the bush and each collar, thereby preventing sliding contact of axial end faces of the boss member and brackets by means of the thrust ring. However, it is difficult to suppress leaks of the lubricant oil through gap spaces between the bush and collars because the lip portion of the seal ring is simply held in sliding contact with an end face of the bush as mentioned hereinbefore. Therefore, for compensating leaked lubricant oil, the bearing of the first prior art necessitates to replenish the oil repeatedly from outside at shorter time intervals.

On the other hand, according to the second prior art, a resilient oil shield member and a dust seal are provided at opposite axial ends of the boss member thereby to prevent leakage of the impregnated lubricant oil in the bush.

However, since the viscosity of the impregnated lubricant oil in the bush is lowered by the heat of friction resulting from sliding movements of the joint shaft within the bush, the provision of the oil shield member and dust seal member as in the second prior art is insufficient for suppressing leaks of the lubricant oil to the outside through a gap space between the oil shield member and the joint shaft and a gap space between the dust seal and the joint shaft. As a result, outer surfaces of the bearing system are covered with leaked lubricant oil to invite deposition of dust and dirt which degrades the appearance of the bearing to a detrimental degree.

Further, in order to prevent leakage of the above-mentioned lubricant oil, it is conceivable to use an oil seal in addition to the dust seal. In such a case, however, it is probable that smooth supply of a lubricant oil is hindered by air which is trapped in the oil seal at the time of supplying a lubricant oil to the gap space between the bush and joint shaft from outside by the use of a grease gun.

DISCLOSURE OF THE INVENTION

In view of the above-discussed problems with the prior art, it is an object of the present invention to provide a seal device for a pin join bearing system, which can prevent leaks to the outside of a lubricant oil which is supplied to sliding surfaces between a bush and a shaft.

It is another object of the present invention to provide a seal device, which permits to supply a lubricant oil to a gap space between a bush and a shaft smoothly from outside and to complete the supply of lubricant oil efficiently within a shortened period of time.

According to the present invention, in order to solve the above-stated objectives, there is provided a seal device for a bearing system having a tubular bush member fixedly fitted in a boss member and having a shaft relatively rotatably passed through the bush member.

The seal device according to the present invention is characterized by the provision of: a first seal ring having a tubular body fitted on the outer periphery of the shaft and having a seal surface provided on an end face at one axial end of the tubular body and a lip portion provided at the other axial end for sliding contact with an end face of the bush member; and a second seal ring fixedly fitted in the boss member radially on the outer side of the first seal ring and having a tubular body fitted in the inner periphery of the boss member and a sliding surface provided at one axial end of the tubular body for sliding contact with the seal surface on the side of the first seal ring.

With the arrangements just described, the first seal ring which is fitted on the circumference of the shaft is provided with an annular seal surface on an end face at one axial end thereof, and the lip portion which is provided at the other axial end is held in sliding contact with an end face of the bush. Therefore, a lubricant oil which is supplied to contacting surfaces between the bush and the shaft is prevented from leaking to the outside by the lip portion of the first seal ring. Besides, since the second seal ring is provided with a sliding surface at one axial end thereof for sliding contact with the seal surface of the first seal ring, gap spaces between the first and second seal rings can be sealed up through two stages. Therefore, should a lubricant oil leak through a gap space between the lip portion of the first seal ring and the bush, it is prevented from leaking to the outside through gap spaces between the first and second seal rings.

In a preferred form of the present invention, the first seal ring is constituted by a lip seal having a tubular body portion provided at one axial end thereof and fitted on the outer periphery of the shaft, and the lip portion provided at the other axial end and extended toward the end face of the bush member, and a slide member located on the side of the one axial end of the tubular body portion of the lip seal and provided with the seal surface on an end face at one axial end thereof for sliding contact with the second seal ring.

In this case, the first seal ring is constituted by a lip seal and a slide member. Accordingly, by the seal surface which is formed on an end face of the slide member is held in sliding contact with the second seal ring, a gap space between the first and second seal rings is sealed up in a reliable manner. At the time the boss member is put in rotation relative to the other joined part, the sliding resistance between the slide member on the first seal ring and the second seal ring is reduced to ensure smooth sliding movements of the first and second seal rings through the slide member. Further, the lip portion of the lip seal, which is extended axially from the other axial end of the tubular body portion, can be held in sliding contact with the end face of the bush in a stable state to provide a good seal between the lip portion and the bush.

In another preferred form of the present invention, the lip seal of the first seal ring is formed of a resilient synthetic resin material, while the slide member is formed of a self-lubricating synthetic resin material. Accordingly, the lip seal is resiliently deformable, and the slide member is imparted with self-lubricating properties.

In a further preferred form of the present invention, the slide member is constituted by a tubular portion fitted on the outer peripheral side of the tubular body portion of the lip seal, and an annular portion extended radially inward from one axial end of the tubular portion to form the seal surface covering an end face portion of the tubular body portion. Accordingly, at one axial end, the slide member can cover the tubular body portion of the lip seal, and the seal surface can be formed on an end face of the annular portion.

In still another preferred form of the present invention, the second seal ring is constituted by a tubular portion fixedly fitted in the inner peripheral side of the boss member in such a way as to circumvent the first seal ring from radially outside, and an inward collar portion projected radially inward from one axial end of the tubular portion to retain the first seal ring in position in the axial direction between itself and an end face of the bush member, the inward collar portion having the sliding surface held in sliding contact with the first seal ring through the seal surface of the latter.

In this case, by the inward collar portion of the second seal ring which is held in sliding contact with the seal surface of the first seal ring, the first seal ring can be retained in position in the axial direction between the inward collar portion of the second seal ring and the end face of the bush member and at the same time a good seal can be formed therebetween.

In a further preferred form of the present invention, the second seal ring is formed of a harder material as compared with the first seal ring. Therefore, the first seal ring can be resiliently held in sliding contact with the hard second seal ring thereby to enhance the seal strength as well as the sliding performance quality of the first and second seal rings.

In a further preferred form of the present invention, an annular thrust washer is provided on the end face of the bush member for sliding contact with the lip portion of the first seal ring. Therefore, as the boss member is turned relative to the other joint member, the lip portion of the first seal ring is allowed to slide smoothly along the surface of the thrust washer which is provided on the end face of the bush.

In a further preferred form of the present invention, an annular thrust washer is provided on the side of the second seal ring for sliding contact with a seal surface of the first seal ring. Accordingly, as the boss member and the other joint member are turned relative to each other, the first seal ring is allowed to slide smoothly along the surface of the thrust washer which is provided on the side of the second seal ring.

BEST MODE FOR CARRYING OUT THE INVENTION

Figure 1:
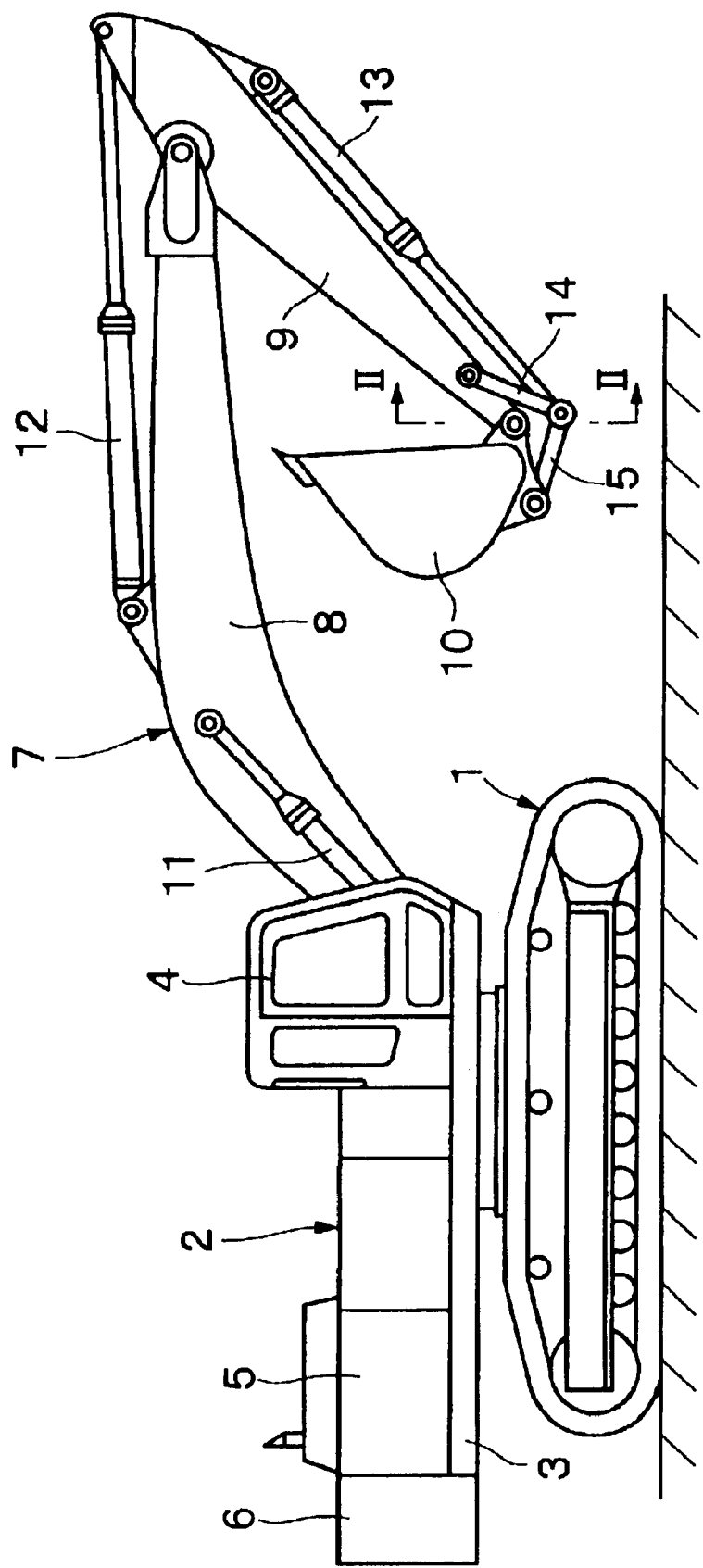
FIG. 1 is a front view of a hydraulic excavator incorporating a seal device for a bearing system, adopted as a first embodiment of the present invention.

Hereafter, the seal device according to the present invention is described more particularly by way of its preferred embodiments which are shown in the accompanying drawings and which are applied to a bearing system in a pin joint portion between an arm and a bucket of a hydraulic excavator.

Referring first to FIGS. 1 to 4, there is shown a first embodiment of the present invention. In these figures, indicated at 1 is a base carrier of a hydraulic excavator, and at 2 is a revolving body which is rotatably mounted on the base carrier 1. The revolving body 2 includes a revolving frame 3, on which cab 4, housing cover 5 and counterweight 6 are mounted.

Indicated at 7 is a working mechanism which is provided on a front portion of the revolving body 2 for lifting loads up and down. The working mechanism 7 is largely constituted by a boom 8 which is pivotally supported on a front portion of the revolving frame 3 through a pin joint, an arm 9 which is pivotally connected to a fore end portion of the boom 8 through a pin joint, and a bucket 10 which is pivotally connected to a fore end portion of the arm 9 through a pin joint.

The boom 8 of the working mechanism 7 is turned up and down by a boom cylinder 11, while the arm 9 is turned up and down relative to the boom 8 by an arm cylinder 12. Further, the bucket 10 is swung back and forth by a bucket cylinder 13 through links 14 and 15.

Figure 2:
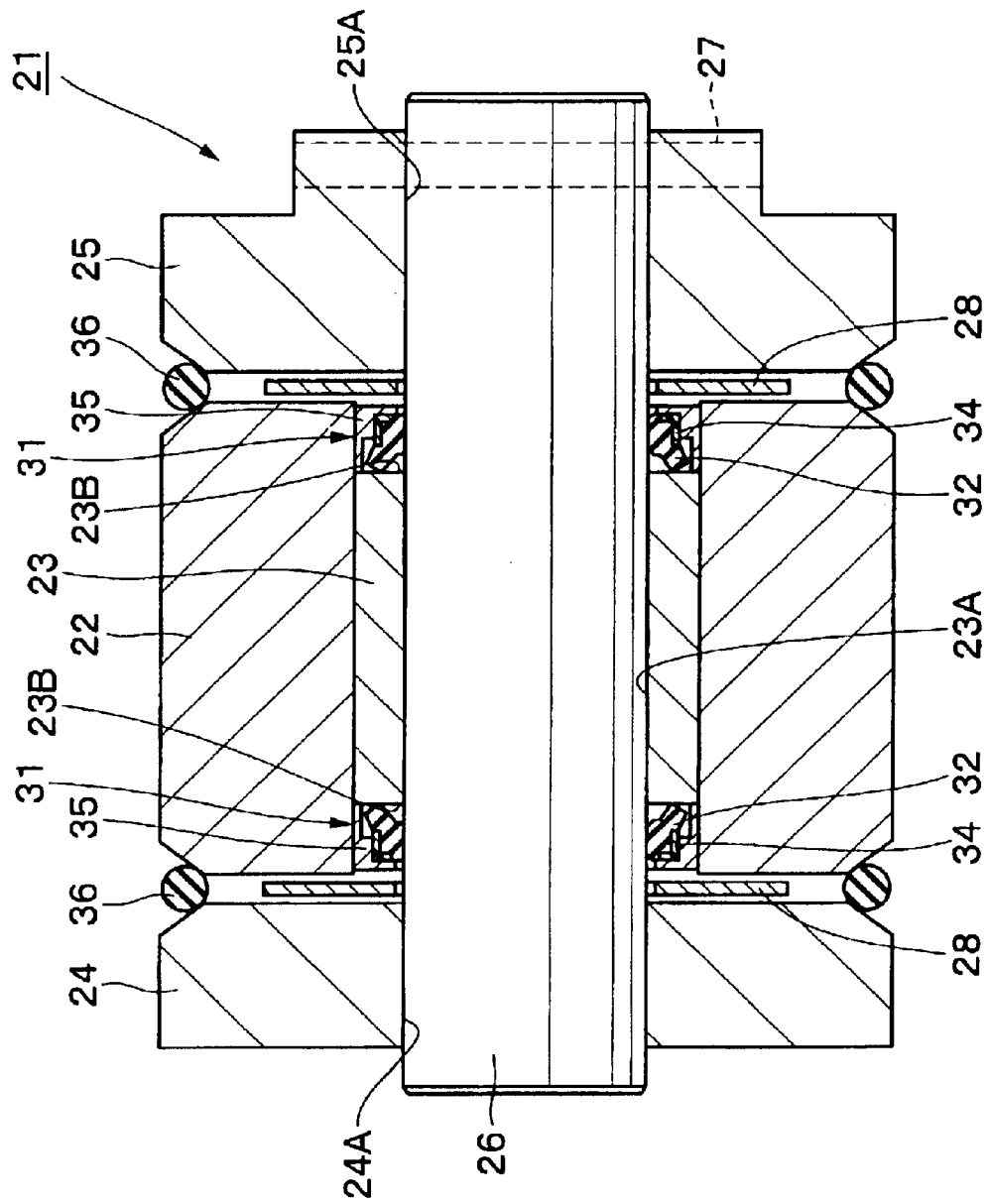
FIG. 2 is an enlarged sectional view of the seal device of the first embodiment, taken on line II—II in FIG. 1.
Figure 3:
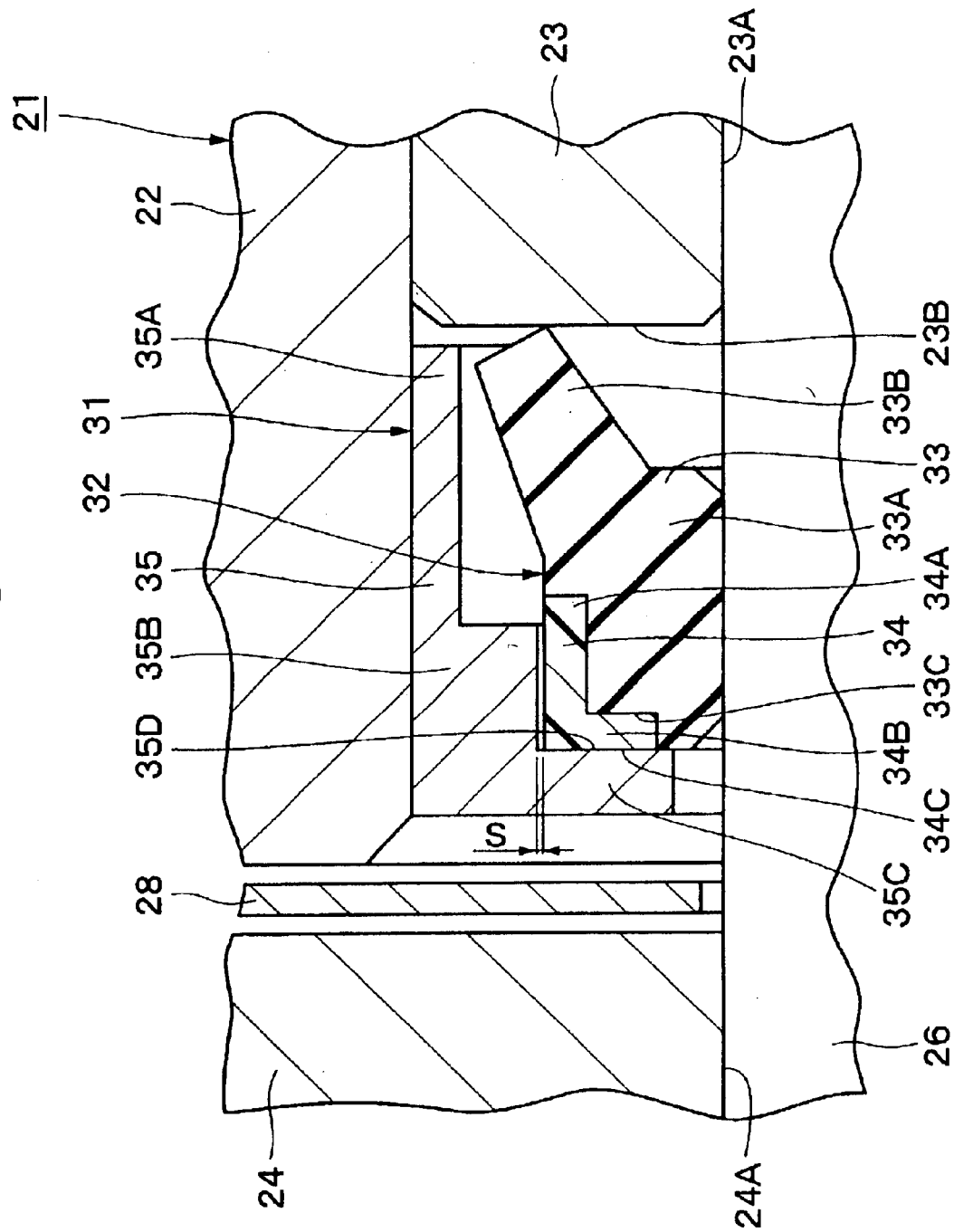
FIG. 3 is an enlarged fragmentary sectional view of the seal device of the first embodiment.
Figure 4:
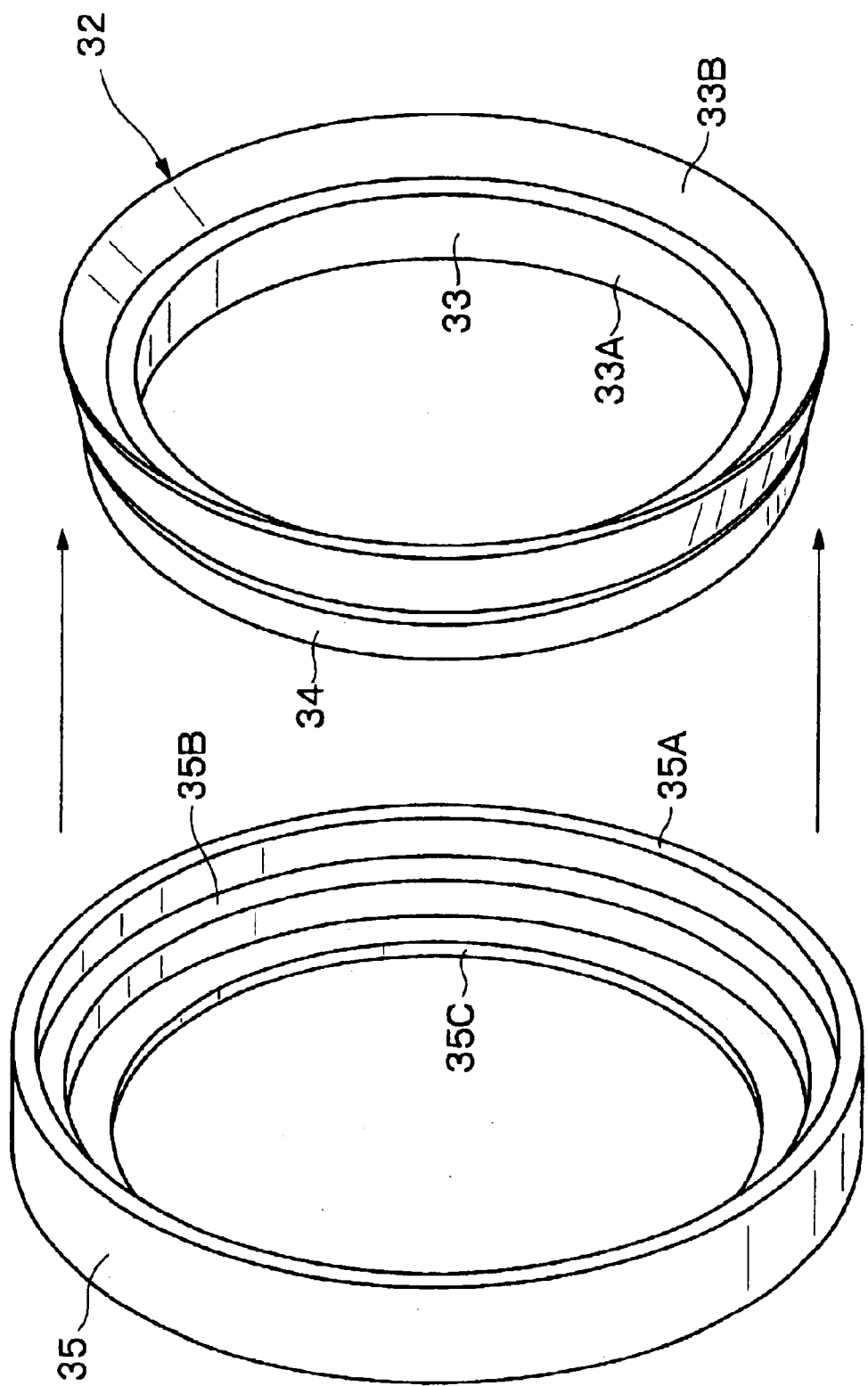
FIG. 4 is an exploded perspective view, showing on an enlarged scale first and second rings of the seal device.

In this instance, the pin joint between the arm 9 and the bucket 10, for example, is provided with a bearing system 21 which is shown in FIG. 2. The bearing system 21 is largely constituted by a boss 22, a bush 23, brackets 24 and 25, a joint shaft 26 and a seal device 31, which will be described hereinafter.

Denoted at 22 is a tubular boss member which is provided integrally at the fore end of the arm 9. A bush 23 is fixedly fitted in the boss member 22 by press-in fitting. In this instance, for example, the bush 23 is formed of a porous sintered metallic material which contains a multitude of pores, and has a lubricant oil impregnated into its pores. Further, the bush 23 is internally formed with an axial bore 23A having its right and left axial end faces 23B.

Indicated at 24 and 25 are a pair of brackets which are provided integrally with the bucket 10. These brackets 24 and 25 are located in such a way as to hold the boss 22 from right and left sides, and are relatively rotatably coupled with the boss 22 by means of a joint shaft 26, which will be described hereinafter. Further, the brackets 24 and 25 are provided with axial bores 24A and 25A in alignment with the axial bore 23A of the bush 23.

Designated at 26 is a joint shaft which connects the boss 22 between the brackets 24 and 25. This joint shaft 26 is slidably fitted in the axial bore 23A of the boss 23 in its longitudinally intermediate portion. Opposite end portions of the joint shaft 26 are placed in the axial bores 24A and 25A of the brackets 24 and 25, respectively, and non-rotatably fixed, for example, on the side of the bracket 25 by means of a stopper bolt 27.

Indicated at 28 are shim plates which are placed in gap spaces between the opposite ends of the boss 22 and the brackets 24 and 25 and fitted on the circumference of the joint shaft 26. Each one of these shim plates 28 serves to adjust the gap width between the boss 22 and the bracket 24 or 25, and to prevent the boss 22 from sliding directly against the brackets 24 and 25 as the boss 22 is turned relative to the latter.

Indicated at 31 are seal devices according to the present embodiment of the invention, which are provided at the opposite axial ends of the bush 23 and between the boss 22 and the joint shaft 26. Each one of these seal devices 31 is constituted by a first seal ring 32 and a second seal ring 35 which are relatively rotatably provided between the boss 22 and the joint shaft 26 as described in greater detail hereinafter.

Denoted at 32 is a first seal ring which is fitted on the circumference of the joint shaft 26. The first seal ring 32 is constituted by a lip seal 33, and a slide tube 34 which is provided integrally with the lip seal 33, which will be described hereinafter.

In this instance, the lip seal 33 is formed in a tubular shape, for example, by the use of resilient synthetic resin material such as nitrile butadiene rubber (NBR), urethane rubber or the like. The lip seal 33 is arranged to have an inside diameter slightly smaller than the joint shaft 26, and resiliently fitted on the circumference of the joint shaft 26.

In the particular embodiment shown, the lip seal 33 is constituted by a tubular body portion 33A with a slide tube 34 which is held in sliding contact with the second seal ring 35 at one axial end of the lip seal, and a lip portion 33B which is extended obliquely in a radially outward direction toward the other axial end away from the tubular body portion 33A. The tubular body portion 33A of the lip seal 33 is formed with a fitting groove 33C of substantially L-shape at one axial end, the fitting groove 33C extending on the opposite sides of a corner portion between an end face and outer periphery of an end portion of the tubular body portion 33A.

The first seal ring 32 is set in position in a resiliently deformed state having the lip portion 33B of the lip seal 33 inclined in a radially outward direction and held in sliding contact with an end face 23B of the bush 23 with a predetermined margin of interference. Thus, the lip portion 33B of the first seal ring 32 functions to prevent leakage of a lubricant oil oozing out onto sliding surfaces between the bush 23 and the joint shaft 26.

Indicated at 34 is a slide tube as a slide member which constitutes the first seal ring 32 along with the lip seal 33. The slide tube 34 is set in the above-mentioned fitting groove 33C of the lip seal 33. Further, the slide tube 34 is formed substantially in L-shape in section by the use of a self-lubricating synthetic resin material, for example, a self-lubricating synthetic resin material such as polyethylene, polyether etherketone, polyurethane, fluorine resin, polyethylene terephthalate (PET), polyimide resin or the like.

On the other hand, selected for the slide tube 34 is a material which is harder than the lip seal 33 but softer than the second seal ring 35 which will be described hereinafter. The slide tube 34 is securely fixed in the fitting groove 33C which is formed on the opposite sides of a corner portion between an end face and outer periphery of the tubular body portion 33A of the lip seal 33 as described hereinbefore.

In this instance, the slide tube 34 is constituted by a tubular portion 34A which is positioned on the outer peripheral side of the lip seal 33, and an annular portion 34B which is formed integrally with and extended radially inward of one end of the tubular portion 34A in such a way as to cover an end face of the tubular body portion 33A of the lip seal 33. An end face of this annular portion 34B which is provided at one axial end of the slide tube 34 serves as an annular seal surface 34C. The slide tube 34 is securely fixed in the fitting groove 33C of the lip seal 33 by the use of an adhesive or by forming same integrally with the lip seal.

Further, an axial pressing force is exerted on the slide tube 34 of the first seal ring 32 because the lip portion 33B of the lip seal 33 is deformed by abutting engagement with the end face 23B of the bush 23. Therefore, the seal surface 34C of the slide tube 34 is pressed against a sliding surface 35D of the second seal ring 35, that is to say, the seal surface 34C is held in sliding contact with the sliding surface 35D of the seal ring 35 with a predetermined margin of interference.

Indicated at 35 is the second seal ring which is fixedly fitted in the inner periphery of the boss 22, rotatably relative to the first seal ring 32. This second seal ring 35 is located radially outward of the first seal ring 32, and held in sliding contact with the seal surface 34C of the first seal ring 32 axially on the opposite side from the lip portion 33B. The second seal ring 35 is formed substantially in L-shape in section, for example, by the use of a metallic or synthetic resin material which is harder than the lip seal 33 and slide tube 34 of the first seal ring 32.

In this instance, the second seal ring 35 is constituted by a thin-wall tubular portion 35A, a thick-wall tubular portion 35B which is formed continuously and integrally with one end of the thin-wall tubular portion 35A, and an annular inward collar portion 35C which is projected radially inward from the thick-wall tubular portion 35B. Further, the thin- and thick-wall portions 35A and 35B of the second seal ring 35 fixedly fitted in the inner periphery of the boss 22 by press-in fitting, leaving a narrow gap space S between and around the inner periphery of the thick-wall portion 35B and the outer periphery of the slide tube 34.

Further, the second seal ring 35 is provided with a sliding surface 35D on the inner side of the annular inward collar portion 35C, which is held in contact with the seal surface 34C of the seal ring 32 thereby to seal up the gap space between the first and second seal rings 32 and 35 liquid-tight. Thus, the second seal ring 35 functions to prevent leaks to the outside of a lubricant oil via the circumference of the slide tube 34 and to shut out dust which get into the bush 23 from outside.

Further, by sliding contact with the slide tube 34 of the first seal ring 32 and in cooperation with the end face 23B of the bush 23, the annular inward collar portion 35C of the second seal ring 35 serves to set and anchor the first seal ring 32 in position in the axial direction without possibilities of dislocation from that position. The second seal ring 35 functions as a seal retainer for the lip seal 33 of the first seal ring 32.

Indicated at 36 in FIG. 2 are O-rings which are fitted around and across gap spaces between the boss 22 and the brackets 24 and 25. With these O-rings 36 which are located on radially outer side of the shim plates 28, the gap spaces between the boss 22 and brackets 24 and 25 are closed to shut out dust or other foreign matter which might otherwise get into the gap spaces from outside.

In an excavating operation of a hydraulic excavator employing the bearing system 21 according to the present embodiment with the above-described arrangements, the bucket 10 which is pivotally connected to the fore end of the arm 9 through a pin joint with the bearing system 21 is turned back and forth about the joint shaft 26 by extension or contraction of the bucket cylinder 13.

As the bucket 10 is turned about the joint shaft 26, the impregnated lubricant oil in the bush 23 becomes less viscous under the influence of heat of friction between the bush 23 and the joint shaft 26, and oozes out from the bush 23 onto contacting surfaces between the bush 23 and the joint shaft 26. In this state, an oil film of the lubricant oil is formed on the sliding surfaces of the bush 23 and the joint shaft 26.

In this instance, according to the present embodiment, the seal device 31 is constituted by the first and second sel rings 32 and 35 which are rotatable relative to each other. The first seal ring 32 is provided with a tubular body which is fitted on the outer periphery of the joint shaft 26, while the second seal ring 35 is fitted in the inner periphery of the boss 22 in such a way as to circumvent the first seal ring 32 from radially outside of the latter.

Further, the first seal ring 32 which is fitted on the joint shaft 26 is constituted by the lip seal 33 with a lip portion 33B which is extended obliquely in a radially outward direction, and the slide tube 34 which is formed integrally with the lip seal 33 and provided with a seal surface 34C on an end face which is located on the side away from the lip portion 33B.

Furthermore, as the lip portion 33B of the lip seal 33 of the first seal ring 32 is held in sliding contact with the end face 23B of the bush 23 with a predetermined margin of interference, the seal surface 34C of the slide tube 34 is pressed in the axial direction toward the annular inward collar portion 35C of the second seal ring 35.

As a consequence, the gap space between the lip portion 33B of the lip seal 33 and the end face 23B of the bush 23 can be sealed up liquid-tight by the lip portion 33B of the first seal ring 32 to prevent leakage to the outside of the lubricant oil on contacting surfaces between the bush 23 and the joint shaft 26.

On the other hand, the sliding surface 35D on the annular inward collar portion 35C of the second seal ring 35, which is fixedly fitted in the inner periphery of the boss 22, is held in sliding contact with the seal surface 34C of the slide tube 34 with a predetermined margin of interference to seal up the gap space between the slide tube 34 of the first seal ring 32 and the second seal ring 35 liquid-tight.

Accordingly, even if the lubricant oil on contacting surfaces between the bush 23 and the joint shaft 26 should leak into a gap space between the lip portion 33B and the second seal ring 35 via the lip portion 33B of the first seal ring 32, its leakage to the outside is blocked by the slide tube 34 of the first seal ring 32 and the annular inward collar portion 35C of the second seal ring 35 which are held in sliding contact with each other. The outer side of the bearing system 21 can be maintained in favorable conditions.

As described above, according to the present embodiment, a seal device of two-stage seal construction is formed by the first and second seal rings 32 and 35 to prevent leakage of the lubricant oil to the outside.

On the other hand, at the time of assembling the seal device 31 of the above construction into the bearing system 21, firstly the first seal ring 32 is placed in the second seal ring 35 before assembling the second seal ring 35 into the inner peripheral side of the boss 22. In the next place, the second seal ring 35 is pushed into the boss 22 until the lip portion 33B of the first seal ring 32 comes into abutting engagement with the bush 23.

Thus, while holding the first and second seal ring 32 between the bush 23 and the inner periphery of the second seal ring 35, one can assemble the two seal rings 32 and 35 together easily on the inner peripheral side of the boss 22.

Further, when assembling the bearing system 21, a lubricant oil is applied on inner peripheral surfaces of the first seal ring 32 and the bush 23 before inserting the joint shaft 26 thereinto. By application of a lubricant oil, the joint shaft 26 can be easily and smoothly inserted into the inner peripheral side of the seal ring 32 and bush 23.

In addition, for supplying a lubricant oil to contacting surfaces between the bush 23 and the joint shaft 26, it may be advantageous to provide an oil supply passage, for example, internally of the joint shaft 26 and to supply a lubricant oil by the use of a grease gun which is connected to the oil passage. In such a case, under the pressure of supplied grease, the lip portion 33B of the first seal ring 32 undergo flexural deformation in a radially outward direction, that is to say, in a direction away from the end face 23B of the bush 23.

As a result, air which has been trapped between the bush 23 and the joint shaft 26 can be forced to go out to the outside via the lip portion 33B and a gap space between the seal surface 34C and the sliding surface 35D to ensure smooth supply of the lubricant oil. On such an occasion, sludge which has accumulated between sliding surfaces of the bush 23 and the joint shaft 26 can be efficiently discharged to the outside so that grease can be smoothly supplied to the sliding surfaces between the bush 23 and the joint shaft 26.

As long as the sliding surfaces between the bush 23 and the joint shaft 26 are in a well lubricated state, leakage of grease to the outside can be prevented by sliding contact of the seal surface 34C on the slide tube 34 of the first seal ring 32 with the sliding surface 35D of the second seal ring 35.

Thus, according to the present embodiment, by the use of the seal device 31 with the relatively rotatable first and second seal rings 32 and 35, a lubricant oil can be sealed in between the bush 23 and the joint shaft 26 and its leakage is blocked in two stages including the lip portion 33B and the seal surface 34C.

Consequently, always the contacting surfaces between the bush 23 and the joint shaft 26 can be maintained in a lubricated state to ensure smooth relative rotations of the bush 23 and the joint shaft 26 at the time of turning the bucket 10 of the working mechanism.

Further, the first seal ring 32 is provided with the self-lubricating slide tube 34 with its seal surface 34C in sliding contact with the annular inward collar 35C of the second seal ring 35. Therefore, as the bucket 10 is turned back and forth, the slide tube 34 functions to reduce the sliding resistance between the first seal ring 32 and the second seal ring 35 to guarantee smooth relative rotations of these parts. In other words, the above arrangements contribute to prevent accelerated or premature wear of the first and second seal rings 32 and 35, that is to say, to prolong the durability and the service life of the seal device 31.

Further, the first seal ring 32 is set in position in the axial direction by and between the bush 23 and the annular inward collar 35C which is formed integrally with the second seal ring 35. Accordingly, the annular inward collar 35C of the second seal ring 35 can hold the lip portion 33B of the first seal ring 32 in sliding contact with the end face 23B of the bush 23 stably under a constant surface pressure to enhance the seal capacity and sliding performance quality of the first seal ring 32.

Upon supplying a lubricant oil like grease to contacting surfaces between the bush 23 and joint shaft 26 from outside, the lip portion 33B of the first seal ring 32 is caused to undergo flexural deformation in a radially outward direction under the pressure of the supplied grease, and as a result the lip portion 33B can be set apart from the end face 23B of the bush 23.

Whereupon, air which has been trapped between the bush 23 and the joint shaft 26 is allowed to escape to the outside via the lip portion 33B and through a gap space between the seal surface 34C and the sliding surface 35D. Accordingly, the lubricant oil can be supplied in a quite smooth manner. In addition, at this time, sludge which may have accumulated on sliding surfaces between the bush 23 and the joint shaft 26 can be efficiently discharged to the outside so that grease can be smoothly supplied to sliding surfaces between the bush 23 and the joint shaft 26.

Furthermore, as long as grease is supplied to sliding surfaces between the bush 23 and the joint shaft 26 to a sufficient degree, leakage of grease to the outside can be prevented by sliding contact of the seal surface 34C on the slide tube 34 of the first seal ring 32 with the sliding surface 35D of the second seal ring 35.

Figure 5:
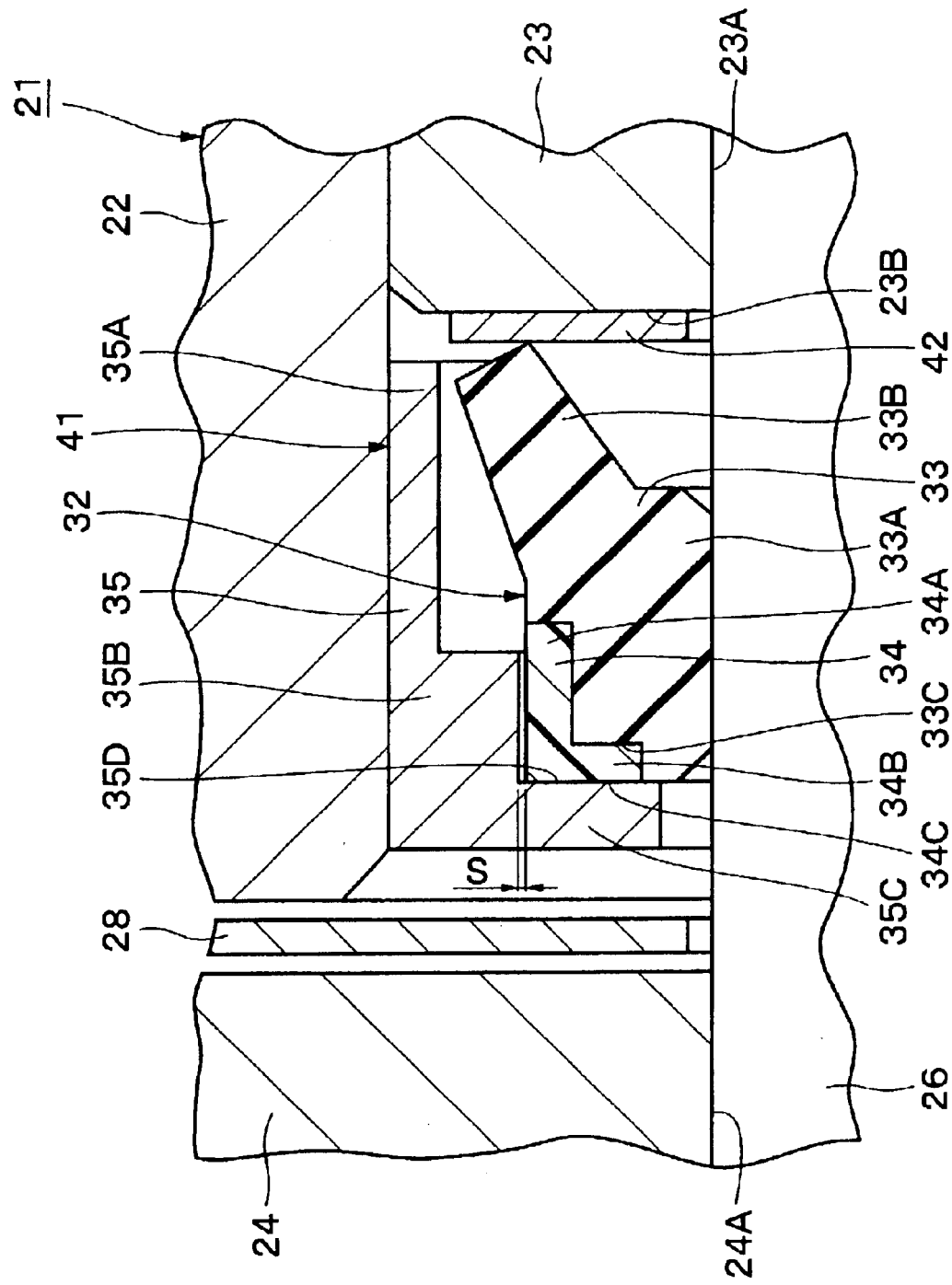
FIG. 5 is an enlarged fragmentary sectional view of a seal device for a bearing system, adopted as a second embodiment of the present invention.

Now, turning to FIG. 5, there is shown a bearing system, which has been adopted as a second embodiment of the present invention. This embodiment has features in that an annular thrust washer is provided on the end face of the bush for sliding contact with the lip portion of the first seal ring.

In the following description of the second embodiment, those component parts which are identical with counterparts in the foregoing first embodiment are simply designated by same reference numerals or characters to avoid repetitions of same explanations.

Indicated at 41 is a seal device according to the present embodiment, which is largely constituted by a first seal ring 32 and a second seal ring 35 similarly to the seal device 31 of the first embodiment. However, the seal device of the present embodiment differs from the first embodiment in that it employs an annular thrust washer 42.

In this instance, for example, the thrust washer 42 is formed in the shape of an annular flat plate by the use of metallic material, and its back side is abutted against and securely fixed to the end face 23B of the bush 23. Further, the front side of the thrust washer 42 is formed into a flat smooth surface as a sliding surface to be held in sliding contact with the lip portion 33B of the first seal ring 32. If desired, the thrust washer 42 may be simply abutted against the end face 23B of the bush 23.

In the case of the present embodiment with the above-described arrangements, one can obtain substantially the same operational effects as in the foregoing first embodiment of the invention.

Especially in the case of the present embodiment, the thrust washer 42 is provided between the end face 23B of the bush 23 and the lip portion 33B of the first seal ring 32, and held in sliding contact with the lip portion 33B of the first seal ring 32. Accordingly, even in a case where the end face 23B of the bush 23 is machined in a relatively rough state, the lip portion 33B of the first seal ring 32 can be directly held in sliding contact with the smooth sliding surface of the thrust washer 42.

Thus, by the provision of the thrust washer 42, the sliding resistance against the lip portion 33B can be suppressed to a minimum, that is to say, abrasive wear of the lip portion 33B can be reduced to a minimum to ensure prolonged durability and service life of the first seal ring 32.

Figure 6:
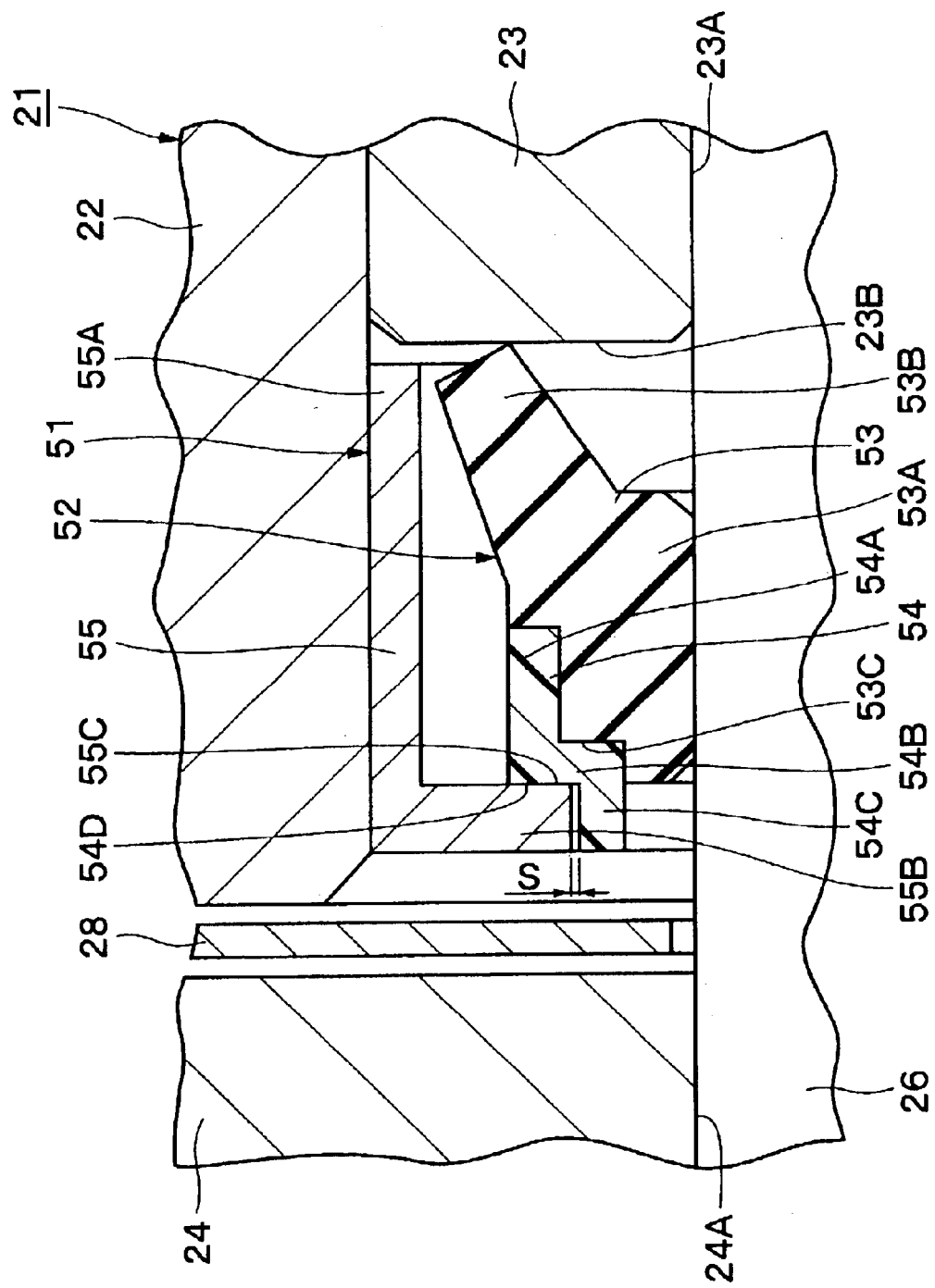
FIG. 6 is an enlarged fragmentary sectional view of a seal device for a bearing system, adopted as a third embodiment of the present invention.

Now, turning to FIG. 6, there is shown a bearing system according to a third embodiment of the invention. This embodiment has features in that one end of the slide tube of first seal ring of the seal device, which serves as a slide member, is extended in the axial direction to provide a seal surface at one side of the slide tube for sliding contact with the second seal ring.

In the following description of the third embodiment, those component parts which are identical with counterparts in the foregoing first embodiment are simply designated by same reference numerals or characters to avoid repetitions of same explanations.

Indicated at 51 is a seal device according to the present embodiment. Similarly to the foregoing first embodiment, the seal device 51 is constituted by first and second seal rings 52 and 55.

Denoted at 52 is a first seal ring according to the present embodiment, which is fixedly mounted around the joint shaft 26. Substantially similarly to the first seal ring 32 in the first embodiment, this first seal ring 52 is constituted by a lip seal 53 and a slide tube 54.

In this instance, the lip seal 53 is constituted by a tubular body portion 53A which is fitted on the circumference of the joint shaft 26 and provided with a slide tube 54 at one axial end thereof, a lip portion 53B which is extended toward the other axial end away from the tubular body portion 53A, and a fitting groove 53C which is formed on the opposite sides of a corner portion between an end face and an outer peripheral portion at one axial end of the lip seal.

On the other hand, the slide tube 54 is formed in a stepped tubular shape as a whole. More specifically, the slide tube 54 is composed of a large diameter tubular portion 54A, an annular portion 54B which is formed integrally inward of one end of the annular portion 54A, and a small diameter tublar portion 54C which is extended toward the one axial end away from a inner side of the annular portion 54B.

Further, the large diameter tubular portion 54A and annular portion 54B of the slide tube 54 are securely fixed in the fitting groove 53C of the lip seal 53, while the small diameter tubular portion 54C is axially projected beyond the lip seal 53. A seal surface 54D is provided on an end face at one axial end of the large diameter tubular portion 54A and the annular portion 54B of the slide tube 54 for sliding contact with a sliding surface 55C, which will be described hereinafter.

Indicated at 55 is a second seal ring according to the present embodiment, which is securely fixed in the inner peripheral side of the boss 22. This second seal ring is constituted by a tubular portion 55A which is fixedly fitted in the inner periphery of the boss 22, and an annular inward collar portion 55B which is projected radially inward from one axial end of the tubular portion 55A.

Provided on the inner side of the annular inward collar portion 55B of the second seal ring 55 is a sliding surface 55C which is held in sliding contact with the seal surface 54D of the first seal ring 52. A gap space between the first and second seal rings 52 and 55 is sealed up liquid tight by sliding contact of the sliding surface 55C with the seal surface 54D of the slide tube 54.

Further, the inside diameter of the annular inward collar portion 55B of the second seal ring 55 is larger than the outside diameter of the small diameter tubular portion 54C of the slide tube 54. Therefore, a gap space or clearance S is left around the outer periphery of the small diameter tubular portion 54C of the slide tube 54. By sliding contact of the seal surface 54D of the slide tube 54 with the sliding surface 55C on the annular inward collar portion 55B of the second seal ring 55, the first seal ring 52 is set in position in the axial direction between the second seal ring 55 and the bush 23.

Thus, in the case of the present embodiment with the above arrangements, one can obtain substantially same operational effects as in the foregoing first embodiment of the invention.

Figure 7:
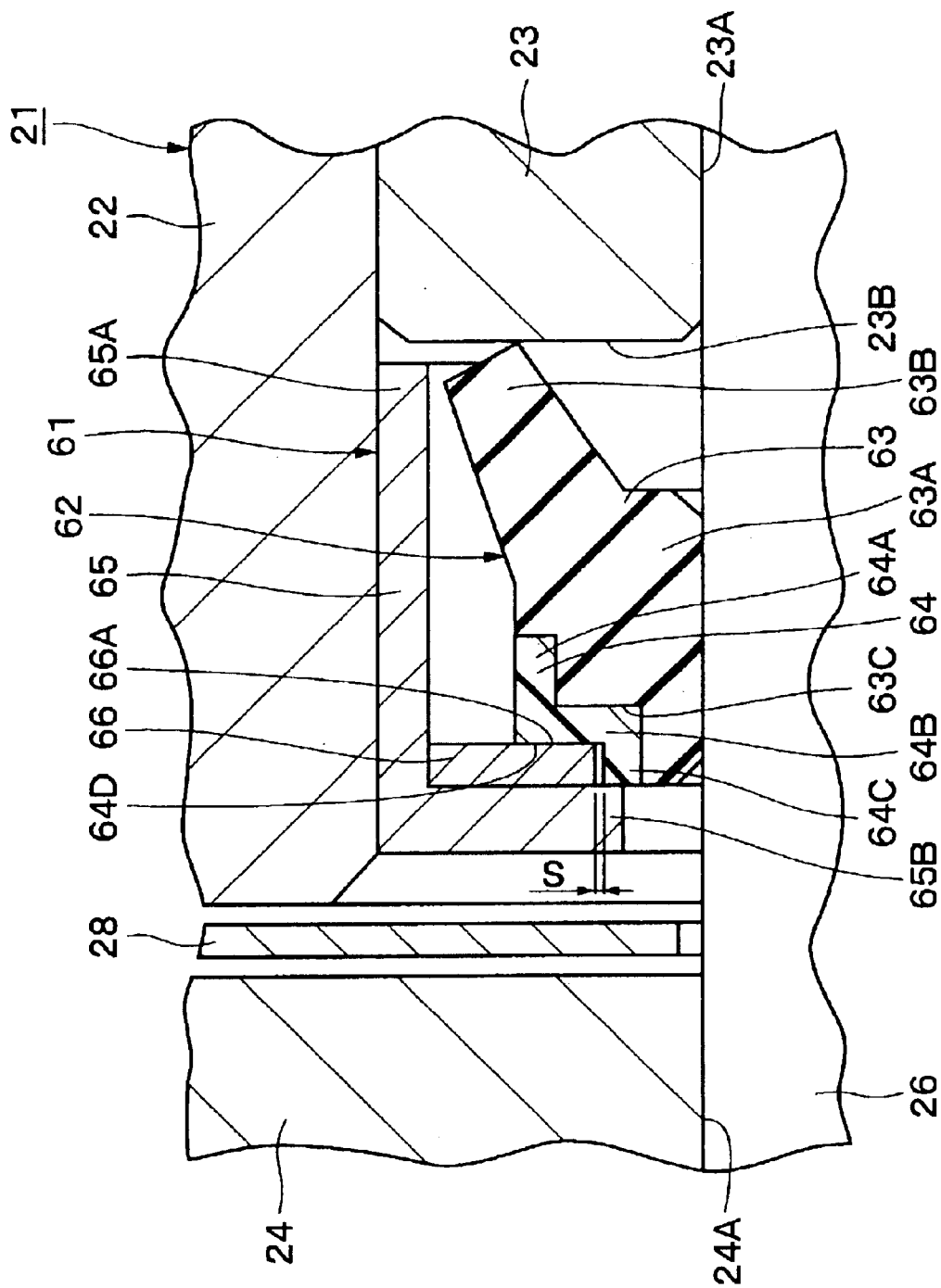
FIG. 7 is an enlarged fragmentary sectional view of a seal device for a bearing system, adopted as a fourth embodiment of the present invention.

Shown in FIG. 7 is a bearing system according to a fourth embodiment of the present invention. This embodiment has features in that the second seal ring of the seal device is provided with a thrust washer for sliding contact with the first seal ring.

In the following description of the fourth embodiment, those component parts which are identical with counterparts in the above-described first embodiment are simply designated by same reference numerals or characters to avoid repetitions of same explanations.

Indicated at 61 is a seal device according to the present embodiment. Similarly to the seal device of the first embodiment, the seal device 61 is constituted by first and second seal rings 62 and 65, which will be described hereinafter.

Denoted at 62 is the first seal ring according to the present embodiment, which is fitted on the circumference of the joint shaft 26. Substantially similarly to the first seal ring 32 of the first embodiment, this first seal ring 62 is constituted by a lip seal 63 and a slide tube 64.

In this instance, the lip seal 63 is constituted by a tubular body portion 63A which is fitted on the circumference of the joint shaft 26 and provided with a slide tube 64 at one axial end thereof, a lip portion 63B which is extended toward the other axial end away from the tubular body portion 63A, and a fitting groove 63C which is formed on the opposite sides of a corner portion between an end face and an outer peripheral portion at the above-mentioned one axial end of the tubular body portion 63A.

On the other hand, the slide tube 64 is constituted by a large diameter tubular portion 64A, an annular portion 64B which is formed integrally inward of one end of the annular portion 54A, and a small diameter tubular portion 64C which is extended toward the one axial end away from a inner side of the annular portion 64B.

The large diameter tubular portion 64A, annular portion 64B and small diameter tubular portion 64C of the slide tube 64 are securely fixed in the fitting groove 63C of the lip seal 63. Further, the slide tube 64 is provided with a seal surface 64D on an end face at one axial end of the large diameter tubular portion 64A and annular portion 64B for sliding contact with a thrust washer 66, which will be described hereinafter.

Indicated at 65 is a second seal ring according to the present embodiment, which is fixedly fitted in the inner peripheral side of the boss 22. This second seal ring 65 is constituted by a tubular portion 65A which is fixedly fitted in the boss 22, and an annular inward collar portion 65B which is extended radially inward from one axial end of the tubular portion 65A.

Designated at 66 is an annular thrust washer which is provided on the inner side of the annular inward collar portion 65B of the second seal ring 65. This thrust washer 66 is either abutted against or securely fixed to the inner side of the annular inward collar portion 65B, in an axially confronting relation with the slide tube 64 of the first seal ring 62. For example, the thrust washer 66 consists of an annular metallic or synthetic resin plate, and provided with a flat and smooth sliding surface 66A on its face for sliding contact with the seal surface 64D of the slide tube 64.

Further, the sliding surface 66A of the thrust washer 66 is held in sliding contact with the seal surface 64D of the slide tube 64 at one axial end of the first seal ring 62. Therefore, a gap space between the thrust washer 66 and the slide tube 64 is sealed up liquid tight, and the first seal ring 62 is retained in position in the axial direction between the thrust washer 66 and bush 23.

Even in the case of the present embodiment with the above-described arrangements, one can obtain substantially same operational effects as in the foregoing first embodiment.

Especially in the case of the present embodiment, the slide tube 64 of the first seal ring 62 is held in sliding contact with the thrust washer 66 with a smooth surface. Therefore, the thrust washer 66 contributes to reduce sliding resistance between the slide tube 64 of the first seal ring 62 and the second seal ring 65, that is to say, to prolong the durability and service life of the first and second seal rings by reducing abrasive wear of these parts.

Figure 8:
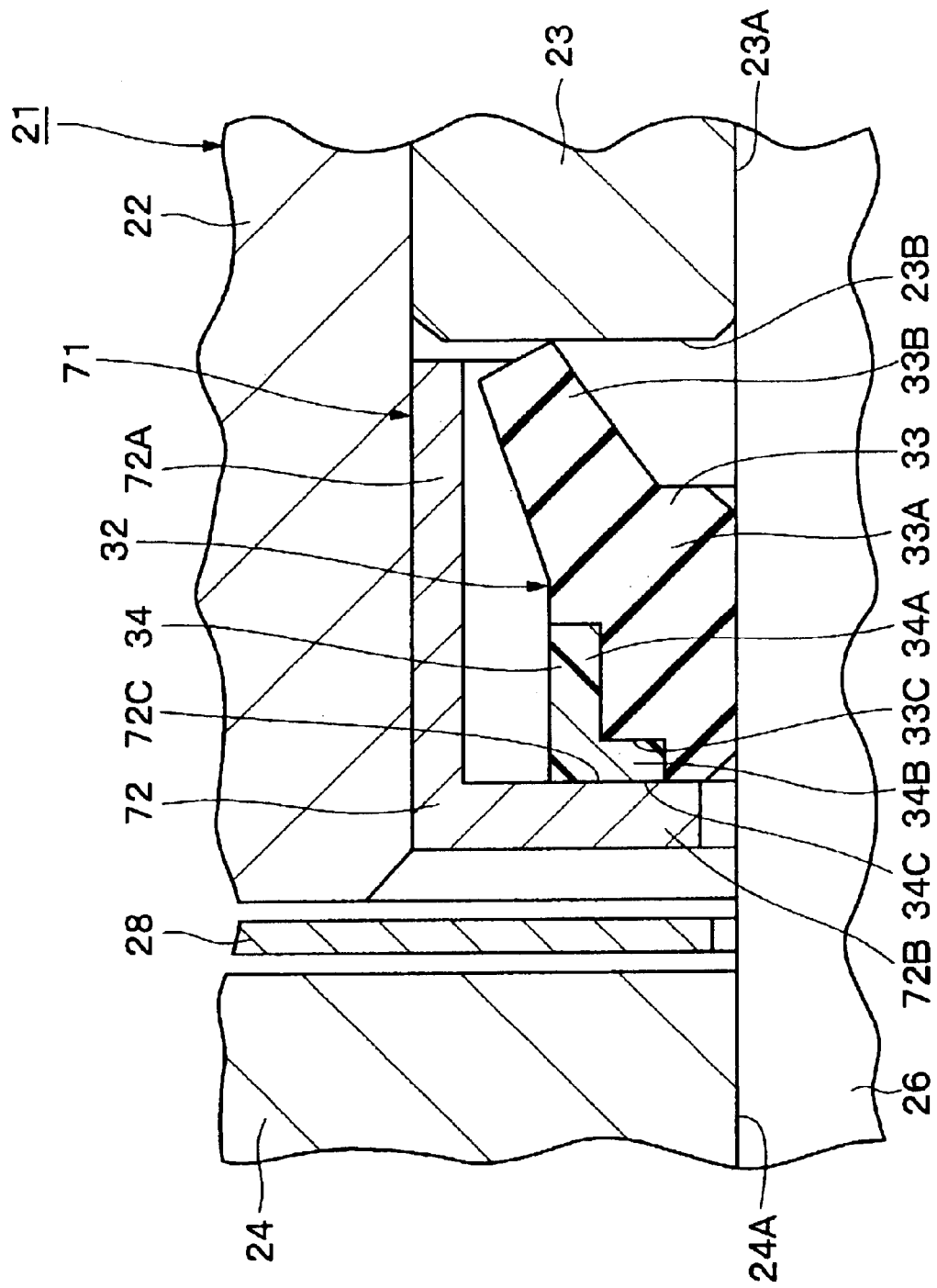
FIG. 8 is an enlarged fragmentary sectional view of a seal device for a bearing system, adopted as a fifth embodiment of the present invention.

Turning now to FIG. 8, there is shown a bearing system according to a fifth embodiment of the present invention. This embodiment has features in that a second seal ring is formed in L-shape in section, and a sliding surface is provided on the inner peripheral surface of an inward collar portion for sliding contact with a seal surface of a first seal ring.

In the following description of the fifth embodiment, those component parts which are identical with counterparts in the foregoing first embodiment are simply designated by same reference numerals or characters to avoid repetitions of same explanations.

Indicated at 71 is a seal device according to the present embodiment. Substantially similarly to the seal device 31 of the first embodiment, the seal device 71 is largely constituted by a first seal ring 32 and a second seal ring 72, which will be described hereinafter. However, the seal device 71 differs from the first embodiment concerning a feature of the second seal ring 72.

Indicated at 72 is a second seal ring according to the present embodiment, which is fixedly fitted on the inner peripheral side of the boss 22. This second seal ring 72 is constituted by a tubular portion 72A which is fixedly fitted in the inner peripheral side of the boss 22 and an annular inward collar portion 72B which is extended radially inward from one axial end of the tubular portion 72A. Thus, the second seal ring 72 as a whole presents an L-shape in section.

Further, a sliding surface 72C which is provided on the inner side of the annular inward collar portion 72B of the second seal ring 72 is held in sliding contact with the seal surface 34C of the first seal ring 32. Thus, a liquid tight seal is formed between the first and second seal rings 32 and 72 by sliding contact of the sliding surface 72C with the seal surface 34C of the slide tube 34.

Moreover, since the sliding surface 72C on the annular inward collar portion 72B of the first seal ring 72 is held in sliding contact with the seal surface 34C, the first seal ring 32 is axially retained in position between the first seal ring 72 and the bush 23.

Thus, even in the case of the present embodiment with the above-described arrangements, one can obtain substantially same operational effects as in the foregoing first embodiment. Especially in the case of the present embodiment, the second seal ring 72 as a whole can be formed in a simple L-shape in section, including the tubular portion 72A and the annular inward collar portion 72B. That is, the second seal ring 72 can be machined to shape quite easily.

Figure 9:
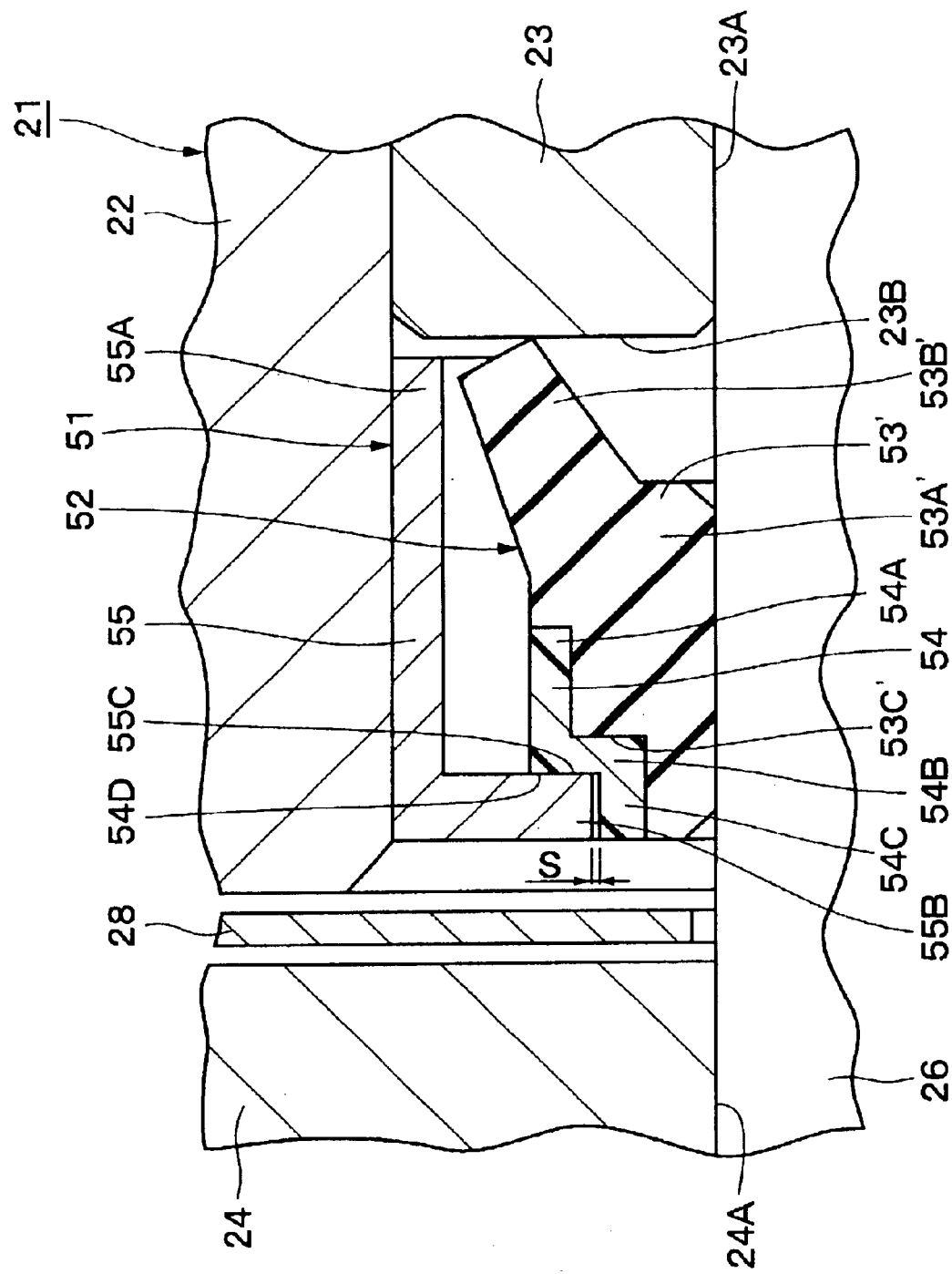
FIG. 9 is an enlarged fragmentary sectional view of a seal device for a bearing system, adopted as a first modification.

In the case of the third embodiment shown in FIG. 6, the small diameter tubular portion 54C of the slide tube 54 is axially projected beyond the end face of the tubular body portion 53A of the lip seal 53 into the annular inward collar portion 55B of the second seal ring 55. However, the present invention is not limited to this particular arrangement. For example, as in a first modification shown in FIG. 9, a lip seal 53' may be constituted by a tubular body portion 53A', a lip portion 53B' and a fitting groove 53C', and one axial end of the tubular body portion 53A' may be extended axially to a position flush with the end face of the small diameter tubular portion 54C of the slide tube 54.

Figure 10:
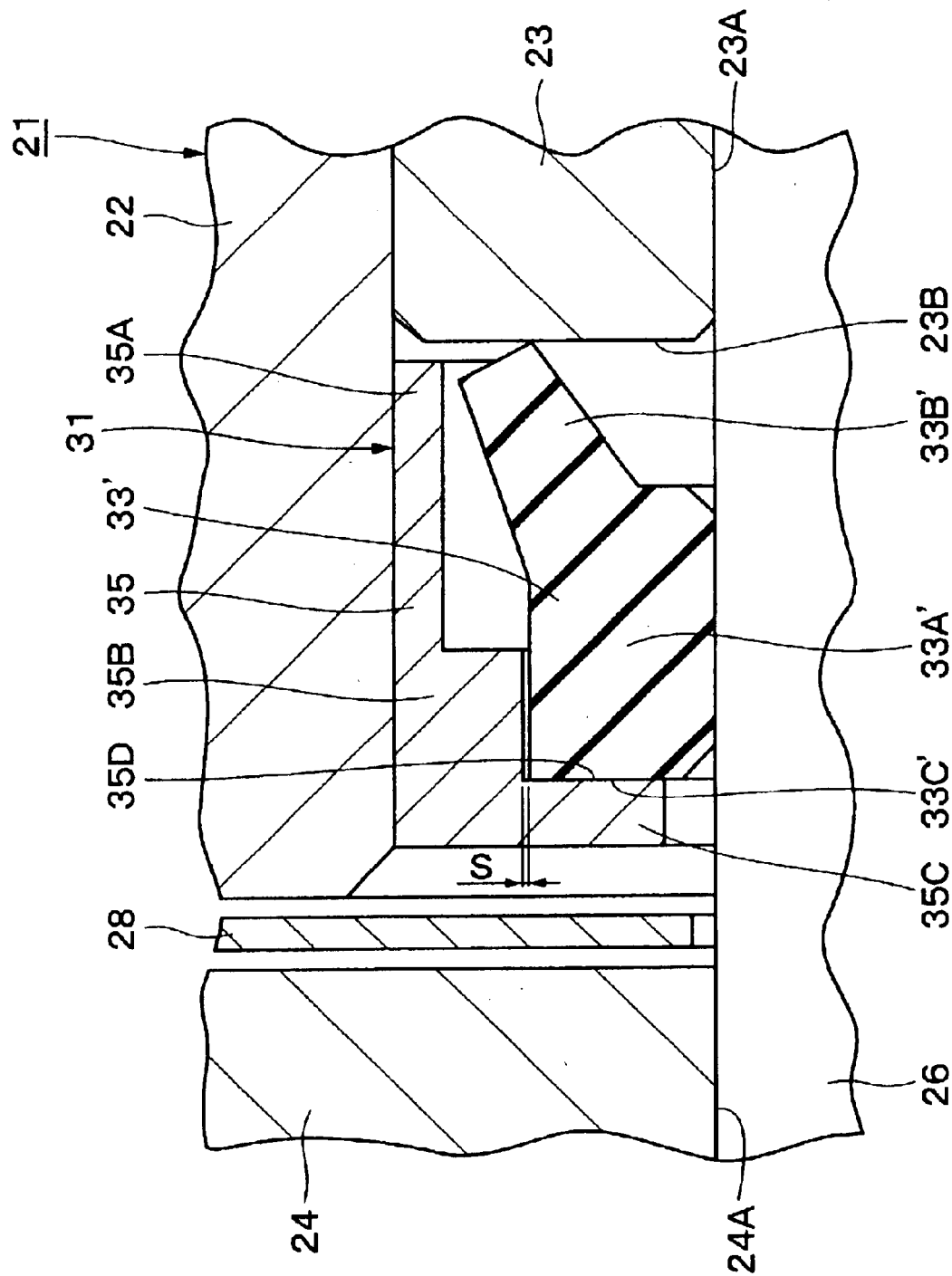
FIG. 10 is an enlarged fragmentary sectional view of a seal device for a bearing system, adopted as a second modification.

Further, in the foregoing first embodiment, by way of example the first seal ring 32 is shown as being constituted by the lip seal 33 and the slide tube 34. However, the present invention is not limited to this particular arrangement. For instance, as in a second modification shown in FIG. 10, the first seal ring may be constituted solely by a lip seal 33' consisting of a tubular body portion 33A' and a lip portion 33B', abolishing the slide tube.

In this case, a seal surface 33C' which is provided on the end face of the lip seal 33' at one axial end of the tubular body portion 33A' is held in sliding contact directly with the sliding surface 35D of the second seal ring 35. This arrangement can be similarly applied to the above-described second, third, fourth and fifth embodiments of the invention.

Further, in each one of the foregoing embodiments, by way of example the seal device of the bearing system is applied to a pin joint between an arm 9 and a bucket 10. However, it is to be understood that the present invention is not limited to the particular example shown. For instance, the seal device according to the present invention can be similarly applied to a pin joint between a fore end of the boom 8 and the arm 9 which consitute the working mechanism 7, a pin joint between a base end portion of the boom 8 and the revolving fram 3, or pin joint portions of the respective cylinders 11, 12 and 13.

Furthermore, in each one of the foregoing embodiments, by way of example the seal device for a pin joint bearing system is applied to a hydraulic excavator. However, the present invention is not limited to the particular example shown, and can be widely applied to other construction machine like hydraulic cranes or other industrial machines.

What is claimed is:

1. A seal device for a bearing system having a tubular bush member fixedly fitted in a boss member and having a shaft relatively rotatably passed through said bush member, said seal device comprising:

a first seal ring having a tubular body fitted on the outer periphery of said shaft and having a seal surface provided on an end face at one axial end of said tubular body and a lip portion provided at the other axial end for sliding contact with an end face of said bush member; and a second seal ring fixedly fitted in said boss member radially on the outer side of said first seal ring and having a tubular body fitted in the inner periphery of said boss member and a sliding surface provided at one axial end of said tubular body for sliding contact with said seal surface, wherein said first seal ring is constituted by a lip seal having a tubular body portion provided at one axial end thereof and fitted on the outer periphery of said shaft, and said lip portion provided at the other axial end and extended toward said end face of said bush member, and a slide member located on the side of said one axial end of said tubular body portion of said lip seal and provided with said seal surface on an end face at one axial end thereof for sliding contact with said second seal ring.

2. A seal device for a bearing system as defined in claim 1, wherein said lip seal of said first seal ring is formed of a resilient synthetic resin material, while said slide member is formed of a self-lubricating synthetic resin material.

3. A seal device for a bearing system as defined in claim 1, wherein said slide member is constituted by a tubular portion fitted on the outer peripheral side of said tubular body portion of said lip seal, and an annular portion extended radially inward from one axial end of said tubular portion to form said seal surface covering an end face portion of said tubular body portion.

4. A seal device for a bearing system having a tubular bush member fixedly fitted in a boss member and having a shaft relatively rotatably passed through said bush member, said seal device comprising:

a first seal ring having a tubular body fitted on the outer periphery of said shaft and having a seal surface provided on an end face at one axial end of said tubular body and a lip portion provided at the other axial end for sliding contact with an end face of said bush member; and a second seal ring fixedly fitted in said boss member radially on the outer side of said first seal ring and having a tubular body fitted in the inner periphery of said boss member and a sliding surface provided at one axial end of said tubular body for sliding contact with said seal surface, wherein said second seal ring is constituted by a tubular portion fixedly fitted in the inner peripheral side of said boss member in such a way as to circumvent said first seal ring from radially outside, and an inward collar portion projected radially inward from one axial end of said tubular portion to retain said first seal ring in position in the axial direction between itself and an end face of said bush member, said inward collar portion having said sliding surface held in sliding contact with said first seal ring through said seal surface.

5. A seal device for a bearing system having a tubular bush member fixedly fitted in a boss member and having a shaft relatively rotatably passed through said bush member, said seal device comprising:

a first seal ring having a tubular body fitted on the outer periphery of said shaft and having a seal surface provided on an end face at one axial end of said tubular body and a lip portion provided at the other axial end for sliding contact with an end face of said bush member; and a second seal ring fixedly fitted in said boss member radially on the outer side of said first seal ring and having a tubular body fitted in the inner periphery of said boss member and a sliding surface provided at one axial end of said tubular body for sliding contact with said seal surface on the side of said first seal ring, wherein said second seal ring is formed of a harder material as compared with said first seal ring.

6. A seal device for a bearing system having a tubular bush member fixedly fitted in a boss member and having a shaft relatively rotatably passed through said bush member, said seal device comprising:

a first seal ring having a tubular body fitted on the outer periphery of said shaft and having a seal surface provided on an end face at one axial end of said tubular body and a lip portion provided at the other axial end; and a second seal ring fixedly fitted in said boss member radially on the outer side of said first seal ring and having a tubular body fitted in the inner periphery of said boss member and a sliding surface provided at one axial end of said tubular body for sliding contact with said seal surface on the side of said first seal ring, wherein an annular thrust washer is provided on an end face of said bush member for sliding contact with said lip portion of said first seal ring, and wherein said first seal ring is constituted by a lip seal having a tubular body portion provided at one axial end thereof and fitted on the outer periphery of said shaft, and said lip portion provided at the other axial end and extended toward said end face of said bush member, and a slide member located on the side of said one axial end of said tubular body portion of said lip seal.

7. A seal device for a bearing system having a tubular bush member fixedly fitted in a boss member and having a shaft relatively rotatably passed through said bush member, said seal device comprising:

a first seal ring having a tubular body fitted on the outer periphery of said shaft and having a seal surface provided on an end face at one axial end of said tubular body and a lip portion provided at the other axial end; and a second seal ring fixedly fitted in said boss member radially on the outer side of said first seal ring and having a tubular body fitted in the inner periphery of said boss member and a sliding surface provided at one axial end of said tubular body for sliding contact with said seal surface on the side of said first seal ring, wherein an annular thrust washer is provided on the side of said second seal ring for sliding contact with said first seal ring, and wherein said first seal ring is constituted by a lip seal having a tubular body portion provided at one axial end thereof and fitted on the outer periphery of said shaft, and said lip portion provided at the other axial end and extended toward said end face of said bush member, and a slide member located on the side of said one axial end of said tubular body portion of said lip seal.

* * * * *